Sept. 5, 1939.  H. W. ZIMMERMAN  2,171,872
TORQUE MEASURING WRENCH
Filed May 8, 1937  3 Sheets-Sheet 1
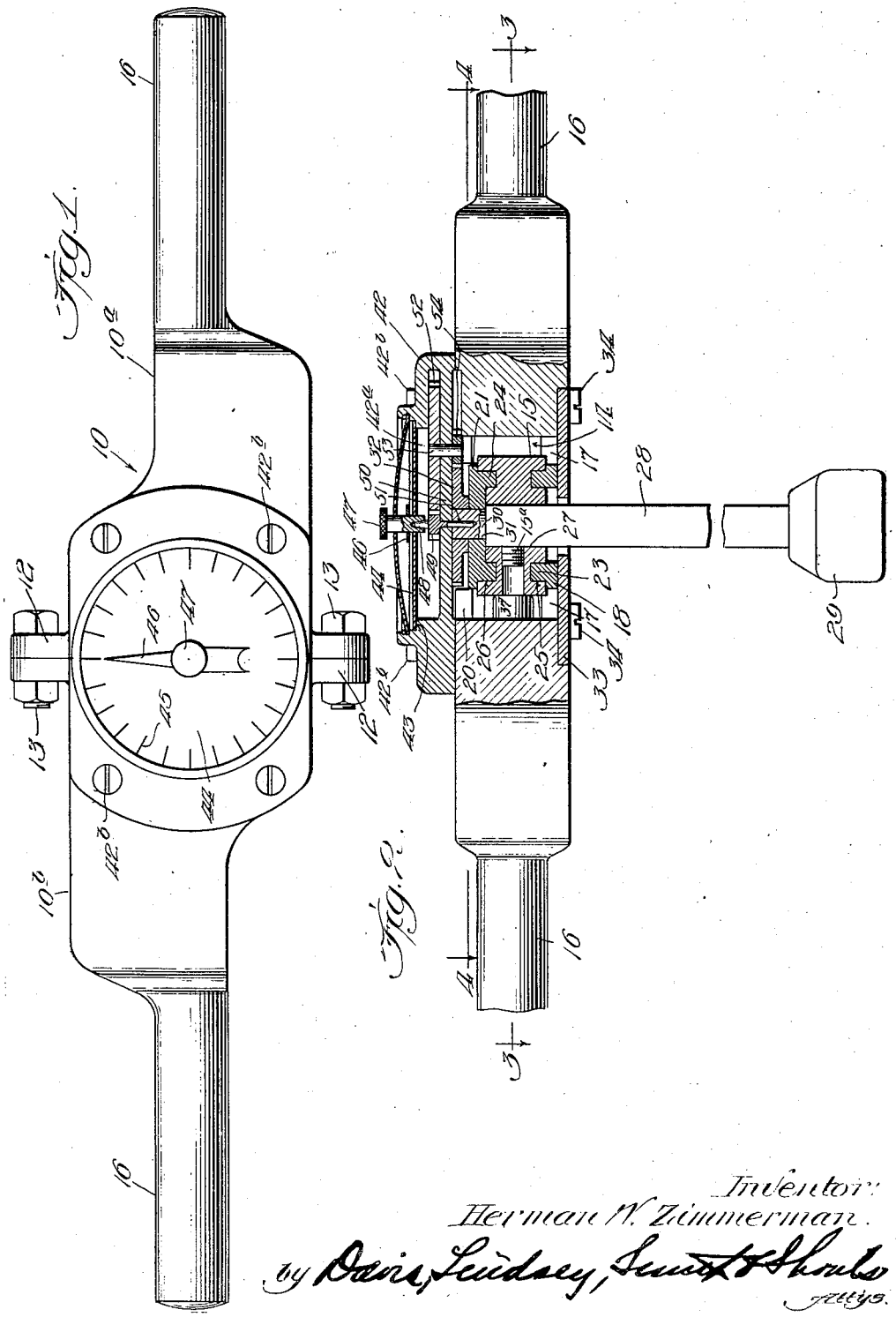

Sept. 5, 1939. H. W. ZIMMERMAN 2,171,872
TORQUE MEASURING WRENCH
Filed May 8, 1937 3 Sheets-Sheet 2
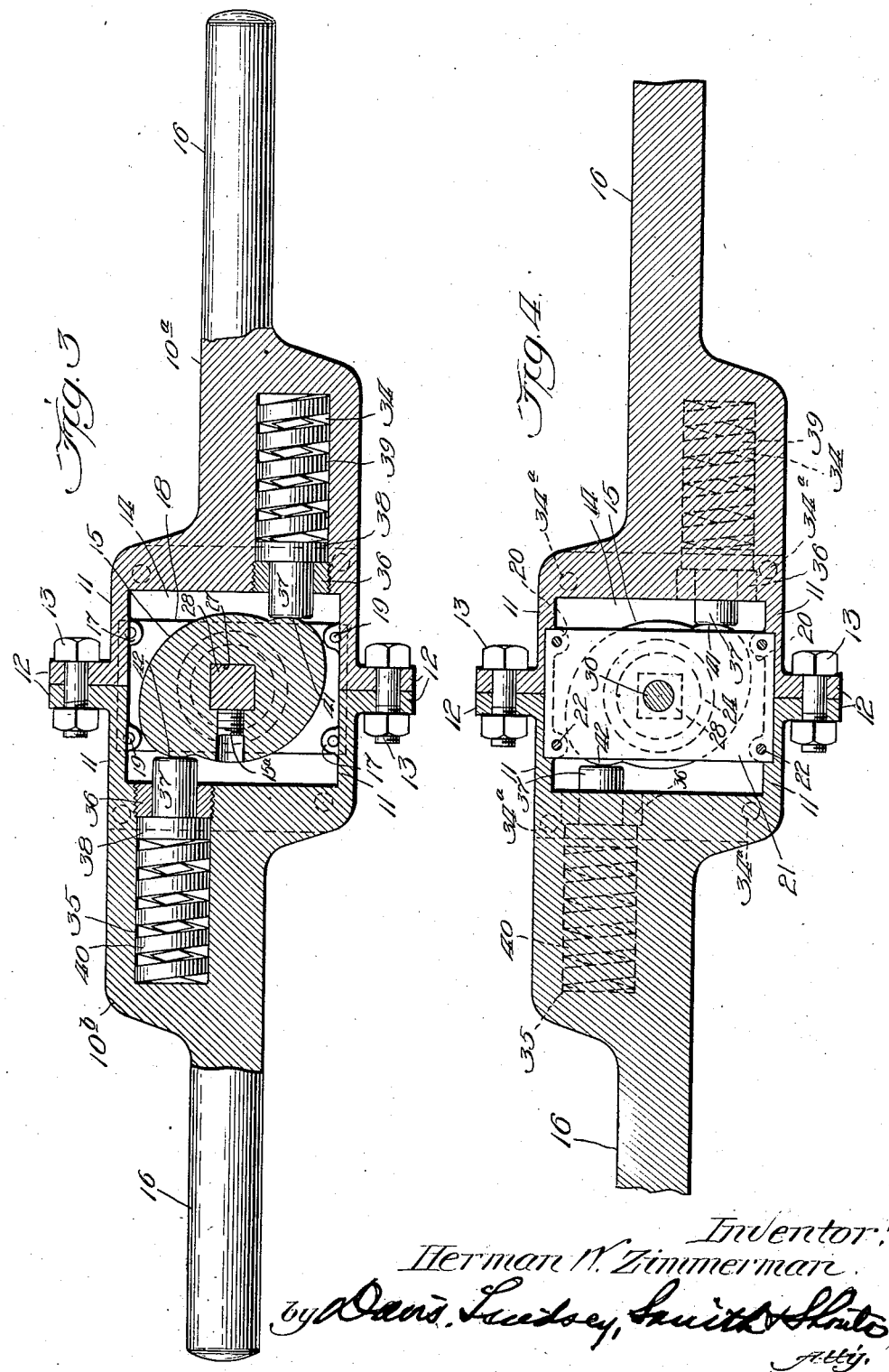
Inventor:
Herman W. Zimmerman
by Davis, Lindsey, Smith & Shonts
Atty.

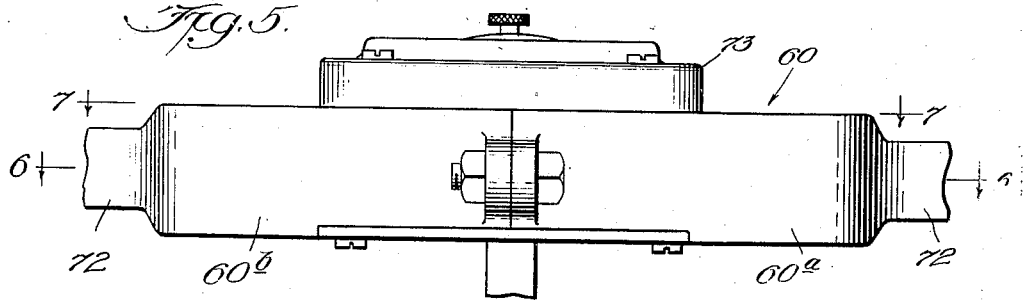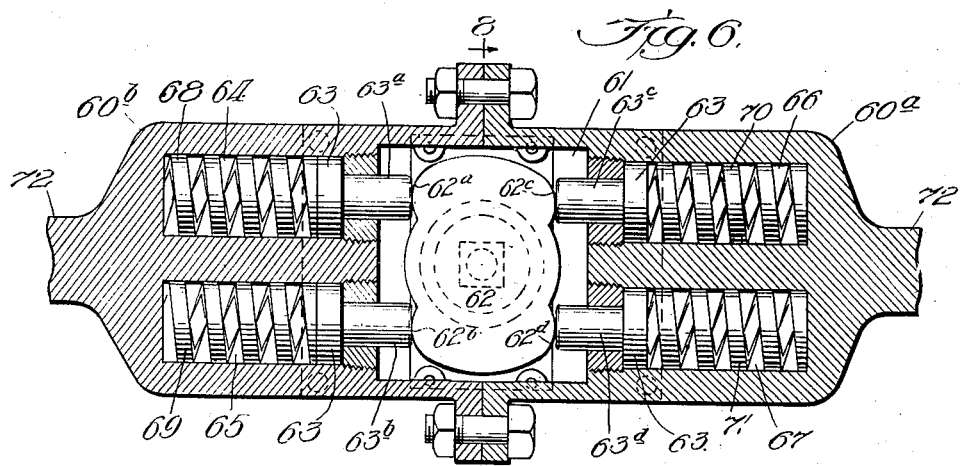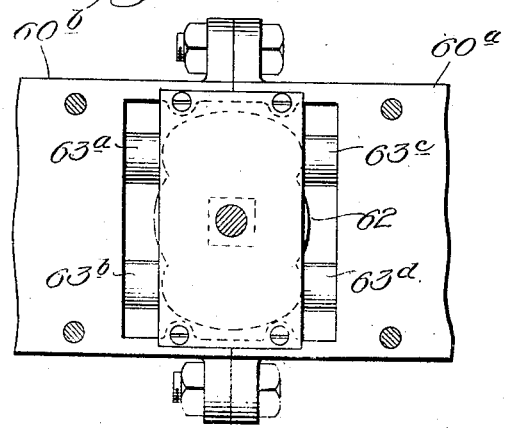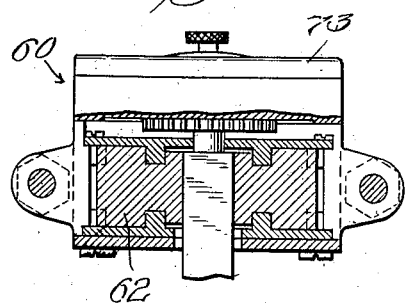

Patented Sept. 5, 1939

2,171,872

UNITED STATES PATENT OFFICE 2,171,872

TORQUE MEASURING WRENCH

Herman W. Zimmerman, Highland Park, Ill., assignor, by mesne assignments, to Frederick G. Wacker, and Grace J. Wacker, Lake Forest, Ill.

Application May 8, 1937, Serial No. 141,427

10 Claims. (Cl. 265—1)

My invention relates to wrenches and it has to do particularly with a wrench arranged for measuring the force or torque applied therethrough in tightening and loosening various kinds of work such as nuts, bolts, studs, etc.

One of the objects of my invention is to provide an improved torque measuring wrench which is of simple construction, which embodies but few parts and is of light weight, which is of a balanced form, which is arranged for two-hand operation and may be readily and quickly handled by the operator, which is inexpensive to manufacture, which may be readily and easily assembled and disassembled, and which is adapted to perform its torque measuring function accurately at all times.

Other objects and advantages will become apparent as this description progresses, and by reference to the drawings wherein, Figure 1 is a top plan view of one form of wrench embodying my invention;

Fig. 2 is a fragmentary side elevational view, partially in section, of the structure shown in Fig. 1;

Fig. 3 is a section taken substantially on line 3—3 of Fig. 2;

Fig. 4 is a section taken substantially on line 4—4 of Fig. 2;

Fig. 5 is a fragmentary side elevational view of another form of wrench embodying my invention;

Fig. 6 is a section taken substantially on line 6—6 of Fig. 5;

Fig. 7 is a section taken substantially on line 7—7 of Fig. 5; and

Fig. 8 is a section taken substantially on line 8—8 of Fig. 6.

Referring to the structure shown in Figs. 1 to 4, inclusive, it includes a body 10 comprising two similar and separable body or handle sections 10a and 10b (Fig. 1), which are provided at their inner or adjacent ends and at their opposite sides with longitudinally extending flanges 11 having out-turned lugs 12 adapted to receive bolt-and-nut fastening devices 13 for securing the two sections together as a single body unit. The side flanges 11 define, between the body sections 10a and 10b, a rectangularly-shaped space 14 in which there is rockably received a double cam member 15 adapted to be operatively engaged with the work. Each body section 10a, 10b is provided with a handle 16, which handles are so located at the opposite ends of the body as to be disposed substantially in longitudinal alignment with each other.

The cam member 15 is rockably supported in the body space 14 in the following manner: The inner surfaces of the opposed side flanges 11, near the bottom edges thereof, are provided with inwardly extending lugs 17 which support the opposite ends of a transverse bottom plate 18 which is secured thereto by suitable fastening devices 19. The inner surfaces of the opposed side flanges 11, near the upper edges thereof, are provided with inwardly extending lugs 20 which support the opposite ends of an upper transverse plate 21 secured thereto by suitable fastening devices 22. The transverse plates 18 and 21 are provided with inwardly extending aligned annular tongues 23 and 24, respectively, which are snugly seated in aligned annular grooves 25 and 26, respectively, in the opposite faces of the cam member 15. The cam member 15 is of sufficient width to fit snugly between the transverse plates 18 and 21 with the plate tongues 23 and 24 engaged as described, whereby such cam member is fixedly supported for rotational or rock movement only.

The cam member 15 is provided at its rock center with a rectangular, or other irregularly shaped, opening 27 in which is received the similarly shaped shank 28 of a suitable adapter member having a work adapter 29 or other element for connecting the same directly with the work. The shank 28 is secured to the cam member 15 by a set screw 15a and it is provided at its upper end with a reduced cylindrical extension 30 which passes upwardly through and beyond a circular opening 31 in the upper transverse plate 21 where it receives a comparatively large gear 32 constituting part of an indicating mechanism which will be described in further detail hereinafter. The bottom of the body opening 14 is closed by a plate 33 having its opposite ends secured in countersunk fashion in the body sections 10a and 10b by screws or other suitable fastening devices 34a.

The handles 16 and body sections 10a and 10b are operatively connected with the work through the cam member 15 and spring means (in each body section) which oppose relative rock movement between the body 10 and the cam member 15. Specifically, the body sections 10a and 10b on the opposite sides of the rock center of the cam member 15 are provided with longitudinally extending spring chambers 34 and 35 leading from the body space 14. The ends of these chambers which open into the body space 14 are closed by screw plugs 36 having axial openings therein through which project the reduced stems 37 of pressure members 38. The chambers 34 and 35 contain similar coil springs 39, 40, respectively, which are of such length as to normally hold the pressure members 38 seated against the screw plugs 36 with the pressure member stem portions 37 projecting similar distances into the space 14 on the opposite sides of the rock center of the cam member 15. The opposite side walls of the cam member 15 are provided, at the opposite sides of the rock center of such member, with oppositely-facing, rounded cam elements 41 and 42 against which the squared ends of the stem portions 37 seat. The stem portions 37 are of such length that the cam member 15 is held in a neutral or balanced condition without any material pressure being exerted thereon by the springs 39 and 40.

It will be seen that, with the foregoing arrangement, when the socket element 29 (Fig. 2) is applied to the work and the handles 16 are grasped and actuated by the operator in clockwise direction (as viewed in Figs. 1, 3 and 4), the force applied by the operator is transmitted to the work through the springs 39 and 40 and the cam member 15. The springs 39 and 40 are so constructed that a certain force is required to overcome their initial tension and to start compression of the same and, as soon as the work offers sufficient resistance to overcome this initial tension, the springs will be compressed, permitting relative rock movement between the body 10 and the member 15. Both of the springs 39 and 40, which are preferably equally balanced, oppose the foregoing action in a uniform manner and, in that way, comparatively light springs may be employed, thereby aiding somewhat in the accuracy of measuring the force applied.

The extent of compression of the springs 39 and 40 and, in turn, the extent of relative rock movement between the body 10 and the member 15 depend upon the amount of force applied through the handles 16; and, by measuring the extent of such rock movement, the amount of force or torque applied to the work may be determined. To that end, I employ an indicating mechanism (Figs. 1 and 2) which takes the form of a casing 42 removably secured to the upper side of the body 10 by screws or other fastening devices 42b. The casing 44 has an upwardly opening, cylindrical chamber 42a which has an internal annular shoulder 43 that supports a dial 44. The dial 44 is provided with a scale 45 calibrated to indicate, preferably, inch-pounds pressure. The gage structure further includes a gage hand or pointer 46 fixedly carried by a knob 47 which is rotatably supported at the central portion of the dial 44 so that the hand 46 may rotate relative to the scale 45. The knob 47 is connected to suitable gear structure through which relative rock movement of the body 10 and member 15 is transmitted to the pointer 46. Specifically, the lower end of the knob 47 is provided with an axially disposed, tapered opening in which is received the upper and complementally shaped end of a shaft 48 which supports a small gear 49. The lower end of the shaft 48 passes downwardly through a suitable opening in a bridge portion 50 constituting the bottom of the gage chamber 42, and it is rotatably received in an opening 51 in the upper reduced cylindrical end 30 of the adapter shank 28. The gear 49 is operatively engaged with another and large horizontal gear 52 mounted in the chamber 42a, which gear is carried by a shaft 53 projecting through and below the bridge 50 to receive another and small gear 54. The gear 54 is located so that its teeth mesh with the larger gear 32 directly carried by the reduced end 30 of the adapter shank 28. With this construction, when the work offers sufficient resistance to cause relative rock movement between the body 10 and member 15, the body 10 will move in clockwise direction while the member 15 remains stationary; and, as this action takes place, the gage structure is moved relatively around and with respect to the gear 32, transmitting motion to gears 52 and 49 and, in turn, to the pointer or hand 46. The extent of movement of these parts depends upon the amount of pressure applied by the operator, as above explained; and, since the scale is calibrated to register this movement in terms of inch-pounds pressure, the operator may readily and quickly determine the amount of pressure applied by observing the position of the gage hand 46. In this way, the operator may set up any particular piece of work to any desired extent, and he may also set up a series of similar or related pieces of work in a uniform manner.

The structure just described is particularly suited for tightening the work and, in cases where it is desirable to measure the force or torque applied in both tightening and loosening the work, I may employ a structure such as shown in Figs. 5 to 8, inclusive. This structure is quite similar to that previously described except that it is provided with four springs cooperating with a four-way cam member instead of the two-way structure shown in Figs. 1 to 4, inclusive.

More particularly, this form of wrench includes a body 60 having separable sections 60a and 60b similar to the body sections 10a and 10b (Figs. 3 and 4). The body 60 is provided with a central rectangular space 61 in which the cam member 62 is mounted similarly to the cam member 15 of the first form. The cam member 62 is provided with four cam elements 62a, 62b, 62c and 62d which are located in pairs on the opposed side walls of the rock member 62 and on opposite sides of the rock center of such cam member; and these cam elements cooperate with the stems 63a, 63b, 63c and 63d, respectively, of pressure elements 63, mounted in spring chambers 64, 65, 66 and 67 arranged in laterally spaced pairs in the separate body sections 60a and 60b and in alignment with the cam elements. Springs 68, 69, 70 and 71, respectively, are mounted in spring chambers and they cooperate with the pressure members 63 in the same manner that the springs 39 and 40 cooperate with the pressure members 38 of the first-described form. In this form of device, like that previously described, the stems of the pressure elements are of such length as to normally engage the cam elements 62a, 62b, 62c and 62d of the cam member 62 without exerting any material pressure thereon so as to hold such cam member in a neutral or balanced position with respect to the body 60.

It will be seen that, in the use of this structure, when the wrench handles 72 are moved in a clockwise direction (as viewed in Fig. 6) to tighten the work, and when the work offers sufficient resistance to overcome the initial tension of the springs 68 and 71, the pressure members 63 will be moved inwardly, compressing these springs similarly to an extent dependent upon the amount of pressure applied. This permits relative rock movement between the body 60 and rock member 62 to an extent dependent upon the pressure applied and the extent of this movement is measured by a gage structure 73 similar to that described in connection with the first form. When the wrench handles are moved in an opposite direction, as when loosening the work, the other springs 69 and 70 will be similarly compressed through the pressure applied by the cam elements $62^b$, $62^c$ to the stems $63^b$ and $63^c$ of the pressure elements 63; and the extent of the depression of these springs and, in turn, the extent of relative rock movement between the body 60 and member 62 will be dependent upon the amount of pressure applied. This pressure may be determined by observing the gage 73 like in the previously described form.

I believe that the operation and advantages of my invention will be readily understood from the foregoing description. The wrench structure as a whole may be readily and quickly handled and actuated by the operator, and the pressure-determining gage structure is so located as to be visually accessible to the operator at all times. The recording action is quite accurate on account of the balanced condition established by the use of the spring arrangement shown and described.

It is to be understood that, while I have shown two forms of structure embodying my invention, other changes in details and arrangement of parts may be resorted to without departing from the spirit and scope of my invention as defined by the claims that follow.

I claim:

1. A torque measuring wrench comprising a body, a member rockably supported by said body, means for engaging said member with the work, means carried by said body at one side of the rock center of said member opposing rock movement of the latter theretoward, means carried by said body at the other side of said rock center opposing rock movement of said member theretoward, both said means serving as the sole transmitter of force or torque to the work from said body through said rock member and being adapted to give way at the same time and to similar extent and permit relative rock movement of said body and member upon the application of pressure to the work through the wrench in a direction to tighten the work, and means for measuring the extent of said rock movement in terms of pressure applied to the work.

2. A torque measuring wrench comprising a body, a member rockably supported thereby, detachable means by which said rockable member is connected to the work, handle means on said body, a compression spring member carried by said body and operatively associated with said member on one side of the rock center thereof yieldably opposing rock movement of said member in one direction, a second compression spring member carried by said body and operatively associated with said member on the other side of said rock center yieldably opposing rock movement of said member in said one direction, the arrangement of the foregoing parts being such that force is applied to the work through said handle, then said body, then said spring members, and finally through said rock member, whereby said springs serve as the sole means transmitting force or torque to the work from said body through said rock member, and means for measuring relative rock movement of said body and member in terms of pressure applied through said body, member and springs to the work.

3. A torque measuring wrench comprising a body, a rock member, means for rockably mounting said member on said body, said member being of elongated form extending transversely of said body and having at its diagonally opposite ends integral cam elements which are located on the opposite sides of its rock center, detachable means for engaging said rock member with the work, oppositely disposed compression spring members located on the opposite sides of the rock center of said rock member, means operatively connecting said spring members with said cam elements so that both of said spring members yieldably oppose rock movement of said rock member in the same direction and serve as the sole means transmitting force to the work from said body through said rock member, and means for measuring the extent of relative rock movement between said body and rock member in terms of pressure applied to the work through said body, rock member and spring members.

4. A torque measuring wrench comprising a body having a centrally-disposed space therein, handle members extending from the opposite ends of said body, a member rockably supported in said space and having provision for operatively engaging the work, a spring member carried solely by said body adjacent one of said handle members and abuttingly engaged with said rock member on one side of its rock center, another spring member similarly carried and located adjacent the other of said handle members and abuttingly engaged with said rock member on the other side of its rock center, said spring members yieldably opposing rock movement of said rock member in the same direction, and means for measuring the extent of relative rock movement between said body and rock member in terms of pressure applied through said handle members to the work.

5. A torque measuring wrench comprising a body having opposite handle sections with a space therebetween, each handle section including a handle member adapted to be grasped by the operator, an elongated member in said space, means for mounting said member for relative rock movement between it and said body, said member having at its opposite ends diagonally opposed rounded contact surfaces, a longitudinally extending chamber in each of said handle sections on the opposite sides of the rock center of said rock member, compression springs of substantially the same form and power mounted in said chambers, pressure members mounted in said chambers and urged toward said rock member by said springs, said pressure members having parts projecting into said space into engagement with said contact surfaces, the arrangement being such that said rock member is held in a neutral or balanced condition by said springs and pressure members, the latter opposing relative rock movement between said body and rock member, and means for measuring relative rock movement between said body and rock member in terms of pressure applied to the work through said handle sections.

6. A torque measuring wrench comprising a body including a pair of opposite handle sections with a space therebetween, said handle sections each including a handle member, a member mounted in said space for rock movement and having provision for operative engagement with the work, means carried by one of said handle sections for engaging said rock member on one side thereof and on the opposite sides of its rock center, means carried by the other of said handle sections for engaging the other of the sides of said rock member on the opposite sides of its rock center, both said means being adapted to give way and permit relative rock movement between said body and rock member upon the application of pressure through said handle sections to the work, and means for measuring the extent of said movement in terms of pressure applied through said handle sections.

7. A torque measuring wrench comprising a body including a pair of opposite handle sections having a space therebetween, each of said sections including a handle member adapted to be grasped by the operator, a member having provision for operative engagement with the work rockably mounted in said space, a pair of laterally spaced spring members carried by each of said handle sections and operative engaged with said rock member in such a way that one spring member of each pair cooperates with one of the spring members of an opposed pair to yieldably oppose relative rock movement of said body and rock member, and means carried by said body for measuring the extent of said movement in terms of pressure applied through said handle sections to the work.

8. A torque measuring wrench comprising a body having a pair of opposite handle sections with a space therebetween, a member having provision for operative engagement with the work rockably supported in said space, a pair of laterally spaced spring members carried by one of said handle sections and operatively engaged with the opposite ends of said rock member along one side thereof on opposite sides of the rock center thereof, similarly arranged spring members carried by the other of said handle sections and operatively engaged with the ends of said rock member along its other side on the opposite sides of the rock center thereof, said spring members being adapted to oppose relative rock movement between said body and rock member in both directions, and means for measuring the extent of said movement in terms of pressure applied through said handle sections to the work.

9. A torque measuring wrench comprising a body member, a member rockably supported by said body member, means for engaging said rockable member with the work, means carried by one of said members and located at one side of the rock center of said rockable member opposing rock movement of said rock member theretoward, means carried by said one member at the other side of said rock center and opposed to said first means for opposing rock movement of said rock member in the same direction as opposed by said first means, both said means being adapted to give way and permit relative rock movement between said members upon the application of pressure to the work through the wrench, and means for measuring the extent of said rock movement in terms of pressure applied to the work.

10. A torque measuring wrench comprising a body member having a handle thereon, a member rockably carried by said body member and having provision for engaging it with the work, diagonally-spaced means carried by one of said members and located on opposite sides of the rock center of said rock member, both longitudinally and laterally of said body member, for opposing relative rock movement between said members and serving as the sole means through which force is transmitted from said body member to said rock member and the work, said means being adapted to give way at both sides when said rock movement occurs in one direction to permit said rock movement, and means for measuring said rock movement in terms of pressure.

HERMAN W. ZIMMERMAN.